(12) United States Patent
Nybom (10) Patent No.: US 8,370,066 B2
(45) Date of Patent: Feb. 5, 2013

(54) METHODS AND APPARATUS FOR TRAVEL INFORMATION

(75) Inventor: Kaj Svante Nybom, Duluth, GA (US)

(73) Assignee: NCR Corporation, Duluth, GA (US)

( * ) Notice: Subject to any disclaimer, the term of this patent is extended or adjusted under 35 U.S.C. 154(b) by 713 days.

(21) Appl. No.: 12/566,763

(22) Filed: Sep. 25, 2009

(65) Prior Publication Data

US 2011/0077856 A1 Mar. 31, 2011

(51) Int. Cl.
*G08G 21/34* (2006.01)
(52) U.S. Cl. .......... 701/533; 701/416; 701/418; 705/16; 705/17
(58) Field of Classification Search .................... 701/35, 701/32.5, 32.6, 32.7, 33.4, 34.3, 400, 408, 701/416, 418; 705/16, 17
See application file for complete search history.

(56) References Cited

U.S. PATENT DOCUMENTS

| 2007/0174259 A1* | 7/2007 | Amjadi ............................. 707/3 |
| 2007/0255493 A1* | 11/2007 | Ayoub et al. ................... 701/211 |
| 2009/0171910 A1* | 7/2009 | Sarkeshik ......................... 707/3 |

* cited by examiner

*Primary Examiner* — Gertrude Arthur Jeanglaude
(74) *Attorney, Agent, or Firm* — Peter H. Priest (57) ABSTRACT

Systems and techniques for providing travel information. An information terminal offers a user an opportunity to select to receive travel information. Upon such a selection by the user, selections and information are received from the user to indicate the user's needs. The selections and information may take the form of explicit selections and entries, or submission of an identifier associated with a use record indicating user needs. Information submitted by the user is examined and appropriate travel directions, local area information, and information relating to the destination or points along the route are furnished to the user. If desired, a user record may be updated with information related to the current transaction.

20 Claims, 12 Drawing Sheets

DIRECTIONS TO SAN DIEGO ZOO

Starting Point: 2556 M Street
Bakersfield, CA 93301

Destination: San Diego Zoo
2920 Zoo Drive
San Diego, CA 92101

South on M Street - 164 yards
Right onto SR-178 (24th St) - 1.7 mi

Take Ramp Right onto SR-58 (SR-99) - 1.8 mi

Road name changes to SR-99 - 24.9 mi

Merge onto I-5 - 85.6 mi

Road name changes to I-10 - 1.2 mi

Keep left onto I-5 - 103.1 mi

Keep left onto I-805 - 7.9 mi

Take Ramp right onto SR-163 (Cabrillo Fwy)

Turn Right onto ramp - 0.2 mi

Turn Left onto 9th Ave, then
Immediately turn Left  - 0.4 mi

Turn Right onto Park Blvd - 0.6 mi

Turn Right onto Zo Dr - 0.3 mi

Turn Left onto local roads - 0.1 mi

ARRIVE SAN DIEGO ZOO

212 — PRINT

214 — ADDITIONAL INFORMATION

216 — FINISH

METHODS AND APPARATUS FOR TRAVEL INFORMATION

FIELD OF THE INVENTION

The present invention relates generally to improved systems and techniques for information delivery. More particularly, the invention relates to systems and techniques for automated delivery of travel directions, local area information, and route and destination information at stops made by a traveler.

BACKGROUND OF THE INVENTION

While many travelers use global positioning system (GPS) devices during their travels, and use sophisticated wireless devices which act as a conduit for information delivery, many do not. In addition, programming information and queries into a GPS or wireless device may require the expenditure of time and effort that must be taken away from driving to the destination.

Every traveler on a trip that is moderately long or longer makes occasional stops for fuel, and may also make stops for refreshment. In addition, travelers who do not use GPS or other routing devices may become lost, so that they need guidance to find the correct route. They may also be interested in knowing about supplies such as fuel and food, and points of interest, further along the route and at the destination.

SUMMARY OF THE INVENTION

The present invention recognizes that travelers typically do not wish to spend excessive amounts of time researching routing information, and especially when actually engaged in travel, may not wish to spend time asking for directions and finding information. Someone who does not normally use electronic devices while traveling may not wish to ask for directions at a stopping point, because the person asked may not know, or may give incorrect advice, or because the oral delivery of directions may be subject to errors and ambiguity. Even users of electronic devices may experience limitations in the capabilities of those devices. For example, the limitations of the input and output capabilities of small devices may lead to abbreviated presentation of information, and may also lead to delivery of information that prevents a user from being able to see a broad and comprehensive view of available information, so that various aspects of information may fail to be shown to the user, even though they are of interest.

The present invention addresses such problems, as well as others, by providing for improved systems and techniques for providing information to a traveler calculated to be relevant to the traveler's needs, as part of the traveler's normal activities, such as fueling or making purchases. An employee operated or self service point of sale terminal, or a stand alone information terminal, may provide selections allowing a user to enter a destination and receive directions to the destination, as well as to receive information of interest relating to the local area, to the destination, or to points along the route. A local terminal or remote server may examine information provided by the traveler and may compute and provide routing information, and may also provide other desired information. The user's progress may also be tracked. For example, if the user pays for a purchase with a credit or debit card, the information provided by the user may be stored. If the user stops along the way at a similarly equipped location and makes another purchase or simply presents the card used to pay at the previous location, the information previously provided by the user is retrieved and used to provide the user with relevant information related to his or her present situation. For example, if the user has become lost since presenting a card at the previous destination, presenting the card at a subsequent destination will result in retrieval of the user's destination and the issuance of new instructions to arrive at the destination. In addition, a user's progress may also be tracked. Such tracking is particularly useful for long trips, because the time or distance between the user's typical stops may be learned and a user may be advised of services of interest based on his or her traveling patterns. As an alternative to tracking a user based on a payment card, the user may be issued a card or other token, which may be issued anonymously, if desired. The user's movements can be tracked and the information gained from such tracking can be used to benefit the user, but the user is not personally identified, so that his or her privacy may be protected. A user may also be invited to create a profile indicating interests, typical trip length, typical time between stops, and the like, and such information, if provided, can be stored and used to simplify the process of information delivery and otherwise provide convenience for the user.

A more complete understanding of the present invention, as well as further features and advantages of the invention, will be apparent from the following Detailed Description and the accompanying drawings.

DETAILED DESCRIPTION

Figure 1:
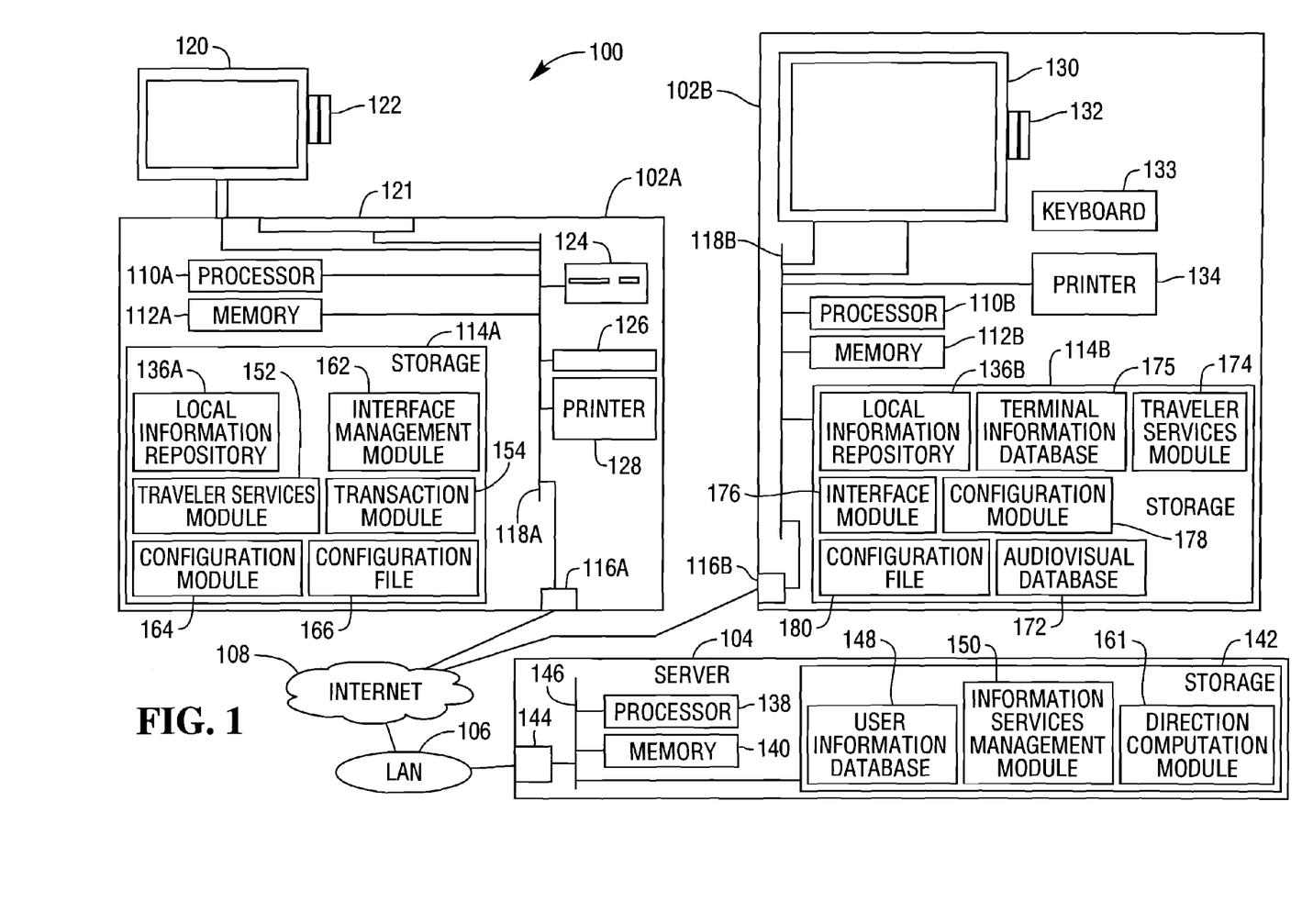
FIG. 1 illustrates a travel information system according to an aspect of the present invention.

FIG. 1 illustrates a travel information system 100 according to an aspect of the present invention. The system 100 includes a plurality of local terminals, of which the exemplary terminals 102A and 102B are illustrated in detail here. It will be recognized, however, that a system such as the system 100 will typically include a large number of terminals distributed over a wide geographic area.

The system 100 also includes a central server 104, with the terminals 102A, 102B, and other terminals communicating with the server 104 over a network 106, which may employ the public Internet 108. The terminals are advantageously associated with locations providing services to travelers, such as gas stations and associated convenience stores, and various ones of the terminals may comprise point of sale terminals including payment devices, such as credit card readers, cash acceptors, or the like. Terminals may also be embodied as free standing information kiosks, or other devices suitable for receiving and delivering information.

The exemplary terminals 102A and 102B are described here in additional detail. The terminal 102A includes a processor 110A, memory 112A, storage 114A, and a network interface 116A, all communicating over a bus 118A. The terminal 102B includes a similar processor 110B, memory 112B, storage 114B, interface 116B, and bus 118B. The terminal 102A is a point of sale terminal and includes a display 120, which may suitably be a touch screen display. The terminal 102A also suitably includes a scanner 121, card reader 122, cash acceptor 124, and cash return 126. The terminal 102A also includes an accompanying printer 128 for printing receipts and information. The terminal 102B is a freestanding kiosk that does not serve as a point of sale terminal, and includes a display 130, a card reader 132, a keyboard 133, and a printer 134. The terminals 102A and 102B include local information repositories 136A, and 136B, respectively. The information repositories 136A and 136E store location information, suitably including address and geographic location information. The repositories 136A and 136B also store local services and point of interest information, which may be furnished to a user without a need to communicate with the server 106.

The server 106 includes a processor 138, memory 140, and storage 142, as well as network interface 144 and bus 146. The server 106 stores a user information database 148, storing a plurality of user records. Each stored user record includes a user identifier, which may include personally identifiable information, or may simply be used to store associated information used by the system 100. For example, a user identifier may tie together a user's destination and stops made along a path to the destination, with the destination and each stop being identified with the same user, but without the identity of this user being known or stored. The user identifier may be taken from a token issued to the user, such as a card, or may be, or be associated with, a code entered by the user at stops along his or her path. The server 106 also stores an information services management module 150, suitably implemented as software residing in storage 142 and transferred to memory 140 as needed for execution by the processor 138. The information services management module 150 receives communications from the various terminals 102A, . . . , 102N and updates user records and provides information as needed.

The terminal 102A suitably implements a traveler services module 152, which is suitably implemented as software residing in storage 114A and transferred to memory 112A as needed for execution by the processor 110A. The traveler services module 152 receives inputs from the user, for example, from the display 120 and card reader 122, and retrieves data from the local information repository 136A and communicates with the server 106 as needed to fulfill user information requests. The terminal 102A also suitably implements a transaction module 154. The transaction module 154 manages purchase transactions and at a suitable point during the transaction, such as at the conclusion of the transaction, may present a message asking if the customer wishes directions or other information. If the answer is in the affirmative, the transaction module 154 invokes the traveler services module 152. If the answer is negative, or if no selection is made after a short time, the transaction concludes. Alternative mechanisms for choosing to receive information may include a persistent selection mechanism, such as a button, that is present on or near the display, whose activation directs the transaction module 154 to invoke the traveler services module 152. As another alternative, detection of information indicating a customer address, such as zip code, can be used to indicate that the customer is from out of town, and such information can prompt the invocation of the traveler services module 152.

The traveler services module 152 presents an initial information services display, such as a menu of choices for a user. The menu preferably includes one or more express choices, allowing the user to rapidly obtain the desired information.

The express choices may further include a choice to present a token or code, to allow retrieval of a user record from the database 148. Depending on the particular configuration of the system 100 and choices previously made by the user, the profile may or may not include personally identifiable information associated with the user, but may suitably include information relevant to the user's needs, such as destination, previously stated preferences, activities previously engaged in, such as previous stops and information requests at those stops. Alternatively or in addition, the user may make choices from the menu, making selections based on the user's preferences and needs at the time. To take an example, a user completes a purchase transaction at the terminal 102A at a gasoline station in Bakersfield, which is a stop made along the way on a trip from Redding, Calif., to the San Diego Zoo in San Diego, Calif. The user previously stopped in Sacramento, Calif. and conducted a transaction. The user also requested and received directions to the San Diego Zoo. A user record was created and stored in the database 148, and this record is associated with a token that was provided to the user. The user record, therefore, indicates that the user's destination is the San Diego Zoo. The user wishes to receive a new set of directions, and after conducting the transaction, the user responds to the message offering travel information by presenting his or her card. The traveler services module 152 communicates with the server 106, sending the server its own identifier and the user identifier taken from the card. The information services management module 150 residing on the server 106 retrieves a terminal location record from a terminal information database 160, in order to retrieve location information for the location of the terminal 102A. As an alternative, the terminal 102A may simply directly send location information to the server 106.

The information services management module 150 examines the user record retrieved from the database 148 and determines that the required information comprises travel directions from the user's location to the destination. The information services management module 150 invokes a direction computation module 161, which returns directions. The directions are then relayed to the traveler services module 152 of the terminal 102A, where they are presented to the user and printed. If desired, the directions may be printed as part of a retail transaction receipt.

The user record is updated with the new location and activity, and this information may be used later to provide insight that can improve the information provided to the user. For example, the user's travel time between stops, travel distance between stops, average speed between stops, and time of day at each stop can be easily determined and used to provide insight into the user's needs. If the user has maintained an average travel speed indicating that he or she has not stopped for a meal, the information management module 150 may increase the prominence of the option to receive dining information for the surrounding area.

To take another example, a user setting out on a journey conducts a transaction at the terminal 102A. The transaction module 154 presents a message asking if travel information is desired. On a positive response from the user, the transaction module 154 invokes the traveler services module 152, which presents a menu offering standardized and express choices. In the present example, the user navigates through the various choices and makes selections for desired information. The traveler services module 152 may suitably employ an interface management module 162, which generates and manages menus and other indicia allowing for user selections and interprets user selections from the various menus and indicia, and gives greater or lesser priorities to various selections based on a user's choices during a current session and based on previously stored user information, such as stored preference information and information derived from an analysis of the user's activities at previous stops. In the present example, the user does not have any stored record, so an initial, standard menu is generated, for example, offering choices of information for the surrounding area, information relating to the user's destination, general information of interest to the user, and the like. The interface management module 162 suitably allows for different levels of menus characterized by lesser and greater specificity, so that user choices at a higher menu level may lead to lower level menus allowing more specific choices. For example, a choice to present local area information may lead to a menu including local dining choices and a selection of local dining choices may lead to a menu of dining categories. The higher level menus preferably include selections offering a general presentation of choices. For example, the local area information menu may offer a selection to present points of interest, travel services, and dining highlights, and the dining choices menu may offer a selection to present a representative sampling of restaurants.

Advertising material and coupons may be presented alongside various choices based on arrangements made by an advertiser with the entity maintaining the system 100 or an establishment hosting terminals. For example, restaurant selections may be accompanied by an opportunity to print a coupon to be used at a restaurant. To take another example, a chain of convenience stores and associated gas stations at which terminals such as the terminal 102A are hosted may indicate similar convenience stores and gas stations along a route and provide coupons to a user good for purchases at such establishments. The system 100 may also provide mechanisms for collecting a fee for information, by adding the fee to a purchase or by allowing collection mechanisms for a terminal that does not also act as a point of sale terminal.

Depending on the particular demands expected to be placed on the terminal 102A, the terminal 102A may be designed to provide greater or lesser capabilities, and these capabilities may be determined by setting configuration parameters using a configuration module 164. The configuration module 164 allows for enabling or disabling various aspects of the information services provided by the terminal 102A. For example, if the terminal 102A is expected to be used as transaction terminal and to service a relatively large number of customers, abbreviated information services may be provided. For example, only express menu options, or even a restricted selection of express menu options may be provided, such as only providing directions. In some embodiments, the configuration file would be expected to be preinstalled, without the configuration being changed in ordinary operation. Such an implementation would be particularly adapted to a pay at the pump gasoline payment device, where a customer would not be expected to be interested in spending time making menu selections and choosing information of interest. Such a device might advantageously be adapted to providing directions based on an entered destination, or based on retrieving stored destination information associated with a user identifier taken from a payment card or other identification card.

The terminal 102B may suitably be a free standing kiosk, without transaction capabilities. Such an implementation allows for the terminal 102B to be used in a more leisurely fashion than a terminal providing both transaction processing and information capabilities, and thus typically allows for a broader range of capabilities. The terminal 102B includes the display 130, which may suitably be larger than the typical display provided by the terminal 102A, as well as the card reader 132, keyboard 133, and printer 134. The terminal 102B will typically offer a comprehensive range of information capabilities, and may include enhanced capabilities, such as an audiovisual database 172, for providing informational clips relating to local points of interest. The terminal 102B will provide a traveler services module 174, a terminal information database 175, an interface module 176, the audiovisual database 172, and a configuration module 178 and configuration file 180, with the configuration file 180 typically storing configuration settings providing a complete range of services.

Figure 2A:
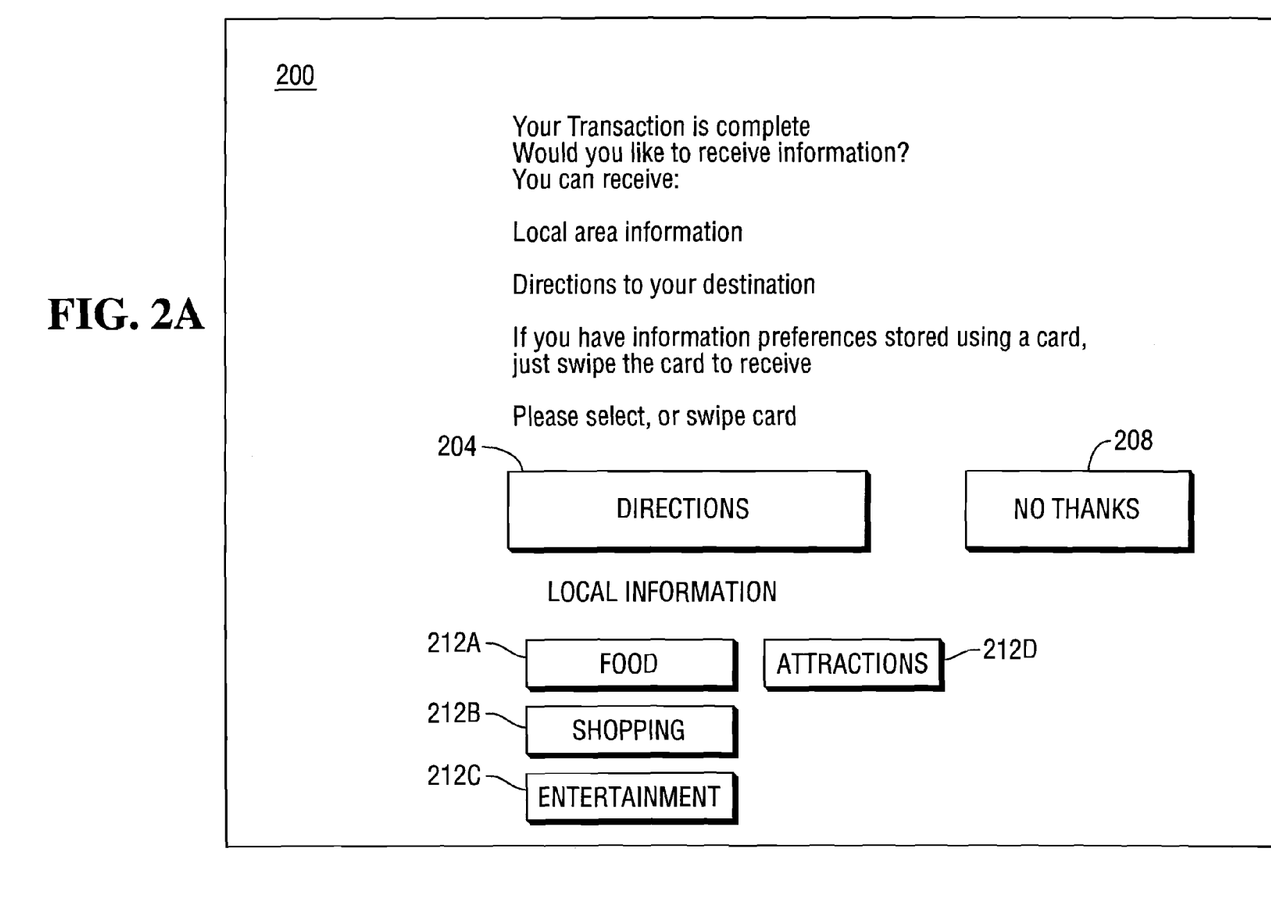
FIGS. 2A-2F illustrate screens of a display presented by a terminal according to an aspect of the present invention.

FIG. 2A illustrates an exemplary display 200 that may be presented by a terminal such as the terminal 102A. The display 200 may be presented at the conclusion of a transaction, and offers the user a choice to receive directions to a destination, or local area information. The user is offered the opportunity to choose from the selector buttons 204, requesting directions, 208, declining the offer of information, and 212A-212D, requesting one of several categories of additional information. The user also has a choice to present a card, and presentation of the card will result in the creation of additional displays without a need to make an explicit selection from the display 200. Here, the user's destination is the San Diego Zoo, and earlier in the user's travels, the user has indicated his destination. A user record has been created for the user and the user has received a card that can be used to retrieve the record. The user therefore presents the card, and the user record, indicating the user's destination and desire for updated directions, is retrieved. A set of directions, here from the user's location in Bakersfield, Calif., to the San Diego Zoo, is automatically generated and displayed.

Figure 2B:
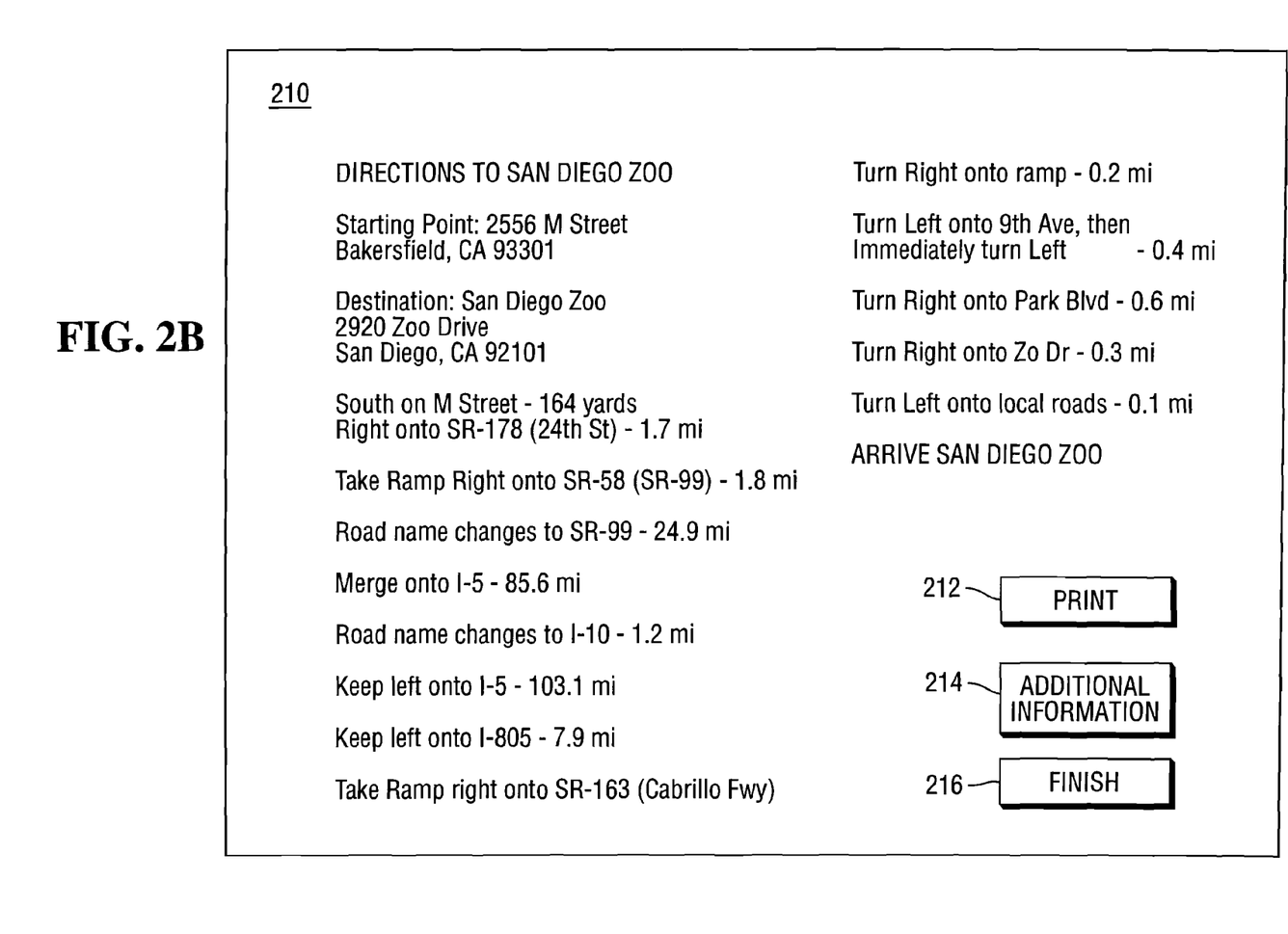

FIG. 2B illustrates a display 210, presented after the user has presented the user's card and the directions desired by the user have been generated. The display 210 presents the desired directions from the present location to the destination, and presents selector buttons 212, 214, and 216, allowing the user to choose to print the directions, to receive additional information, or to finish.

Figure 2C:
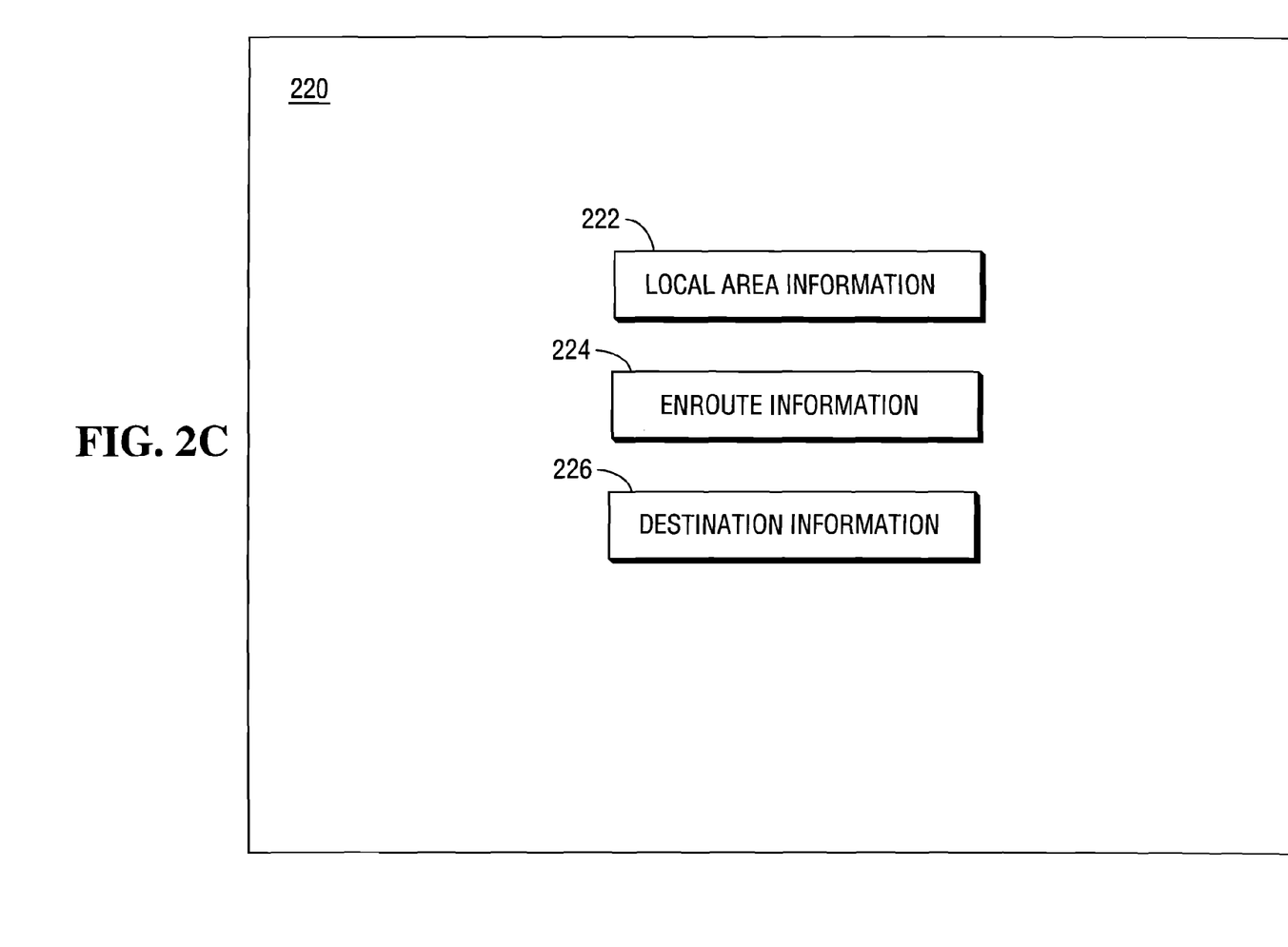

FIG. 2C illustrates a display 220, presented after the user has chosen to receive additional information. The user has the choice of the selector buttons 222, 224, and 226, allowing for selection of local area information, en route information, and destination information.

Figure 2D:
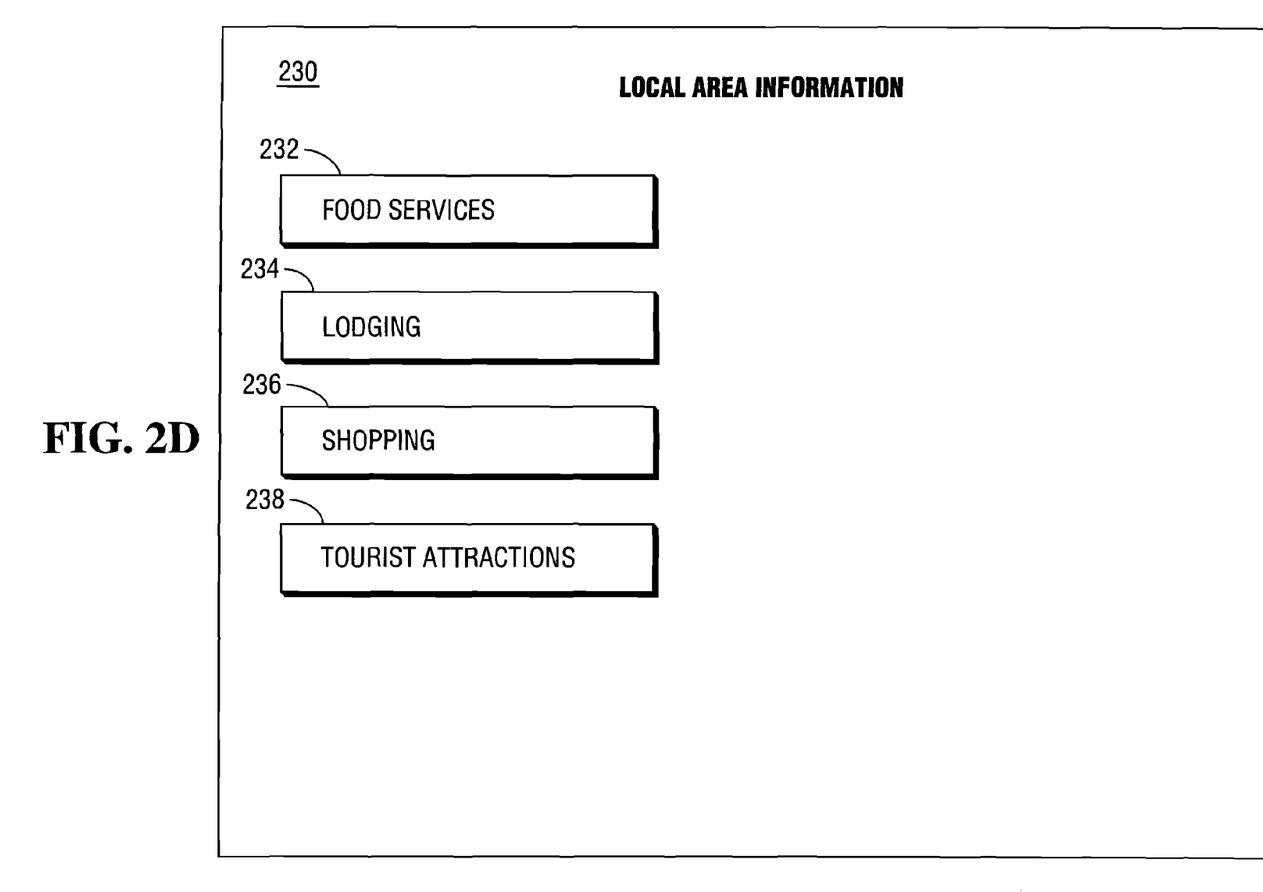

FIG. 2D illustrates a display 230, presented after the user has chosen to receive local area information. The user is presented with selection buttons with selector buttons 232-238, allowing selection of food services, lodging, shopping, and tourist attractions.

Figure 2E:
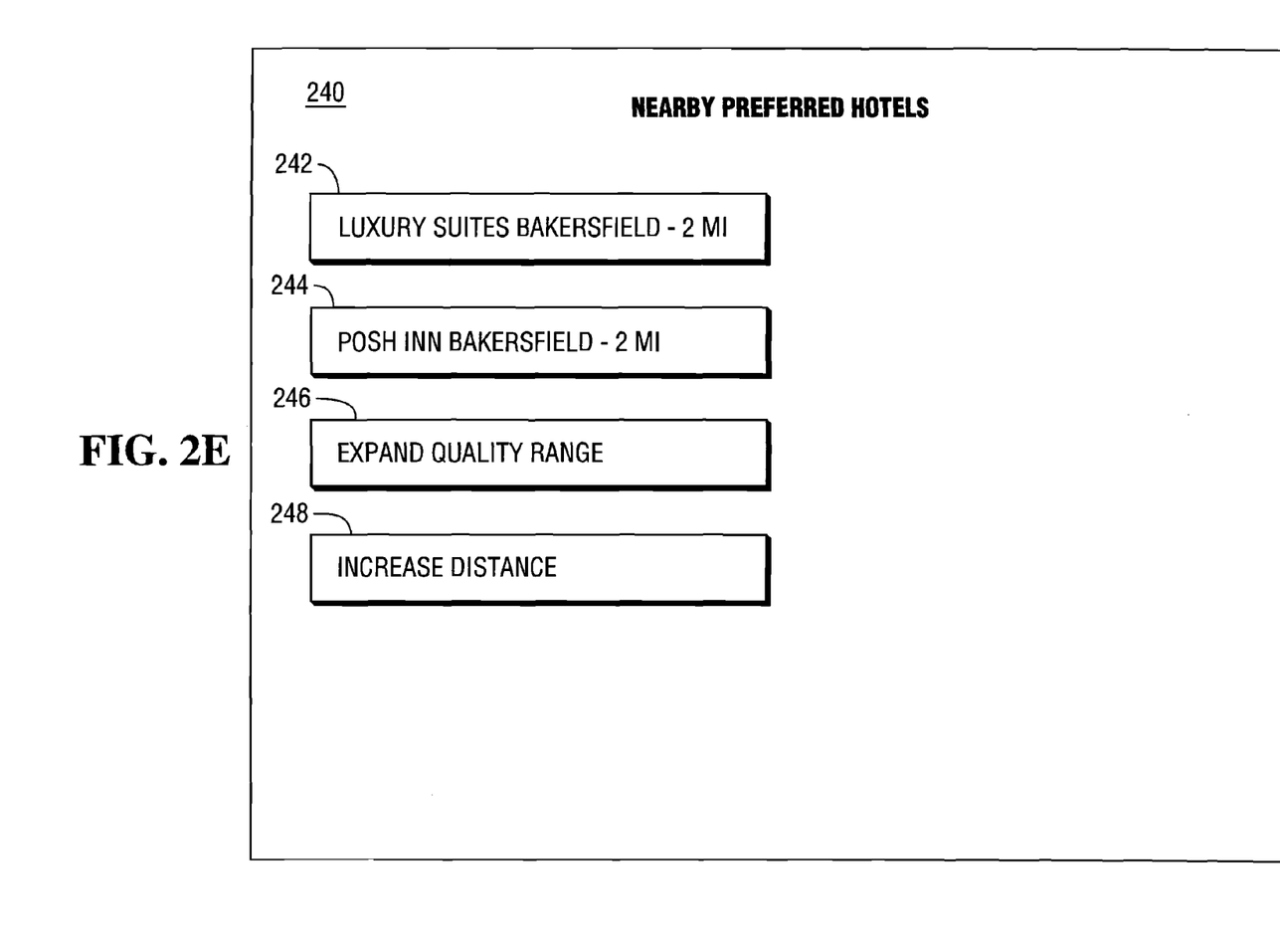

FIG. 2E illustrates a display 240, presented after the user has chosen to receive lodging information. A selection of nearby relatively high standard hotels is presented, allowing the user to choose one of them by activating the selector button 242 or the selector button 244, or to expand the allowed quality range or distance by activating the selector button 246 or 248.

Figure 2F:
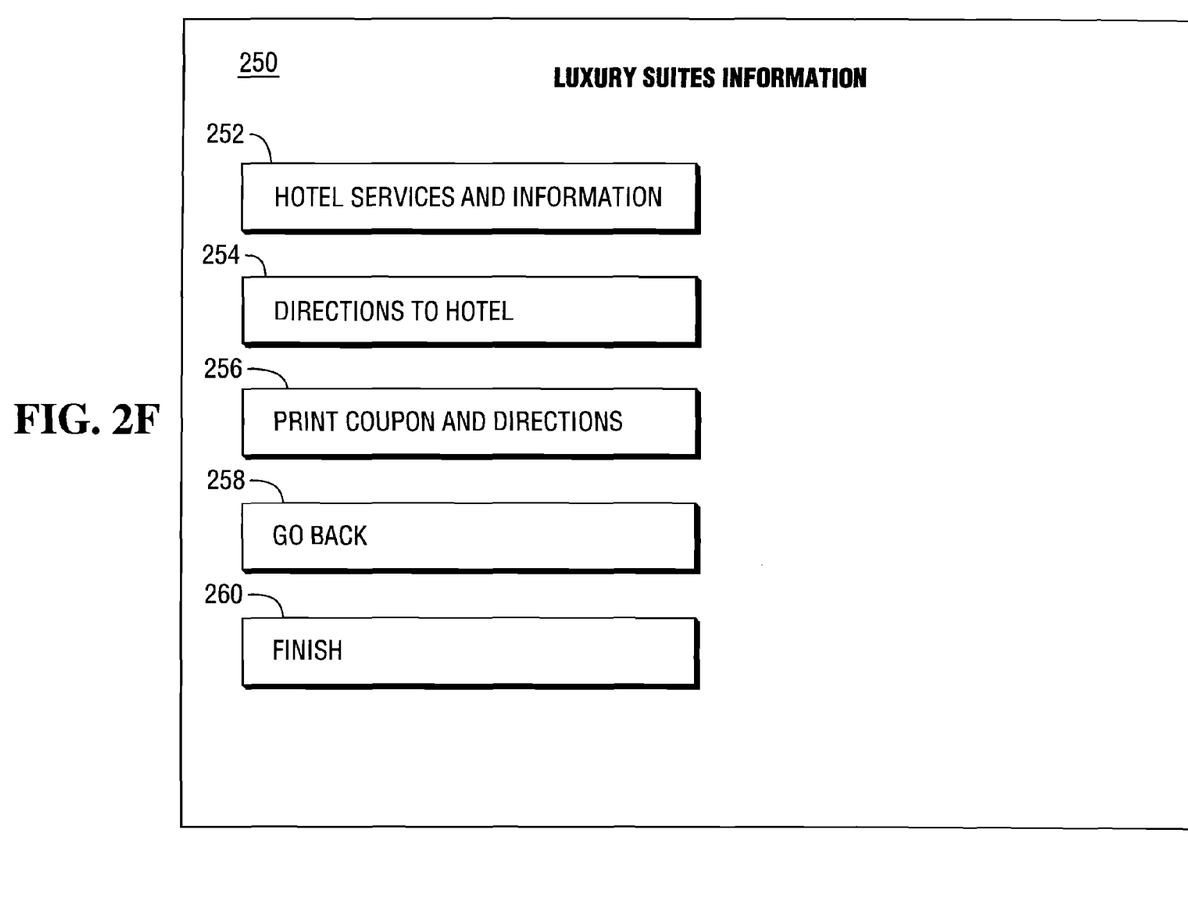

FIG. 2F illustrates a display 250, presented after the user has chosen to receive information relating to the Luxury Suites Bakersfield. The buttons 252-256 allow for the use to select information relating to hotel information and services, directions to the hotel, and printing a coupon with a discount offer from the hotel and printed directions to the hotel. The button 258 allows for the user to return to the previous display, and the button 260 allows for the user to finish the session.

Coupons and other offers and discounts for hotels and other vendors and service providers, such as restaurants, attractions, retailers, and the like, may be updated based on information received by the system 100, and may, for example, adjust the discount offered based on current occupancy levels or the number of travelers selecting the vendor or service provider. The placement of a vendor or service provider in a preferred position may be based on any of a number of factors, such as an assessment of quality by professional reviewers or by members of the public, or the existence of a relationship between an entity hosting a terminal such as the terminal 102A or the operator of the system 100.

Figure 3A:
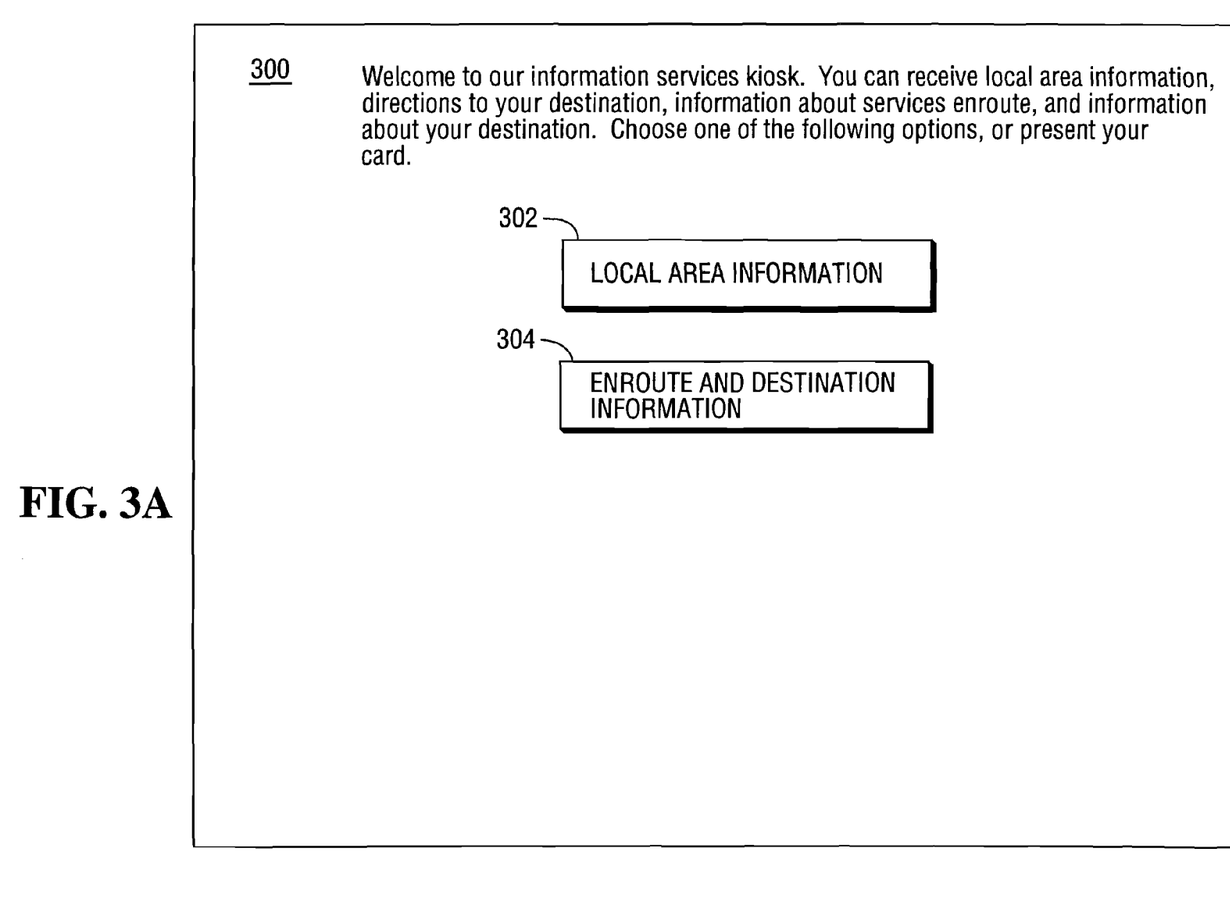
FIGS. 3A-3D illustrate screens of a display presented by an alternative terminal according to an aspect of the present invention.

FIG. 3A illustrates a display 300 presented by the terminal 102B. The display 300 presents an introductory message and an initial menu selection, allowing a user to make various choices using the selector buttons 302, and 304, providing choices of receiving local area information or entering a destination. The introductory message also prompts the user to present a stored identification token, if desired.

Figure 3B:
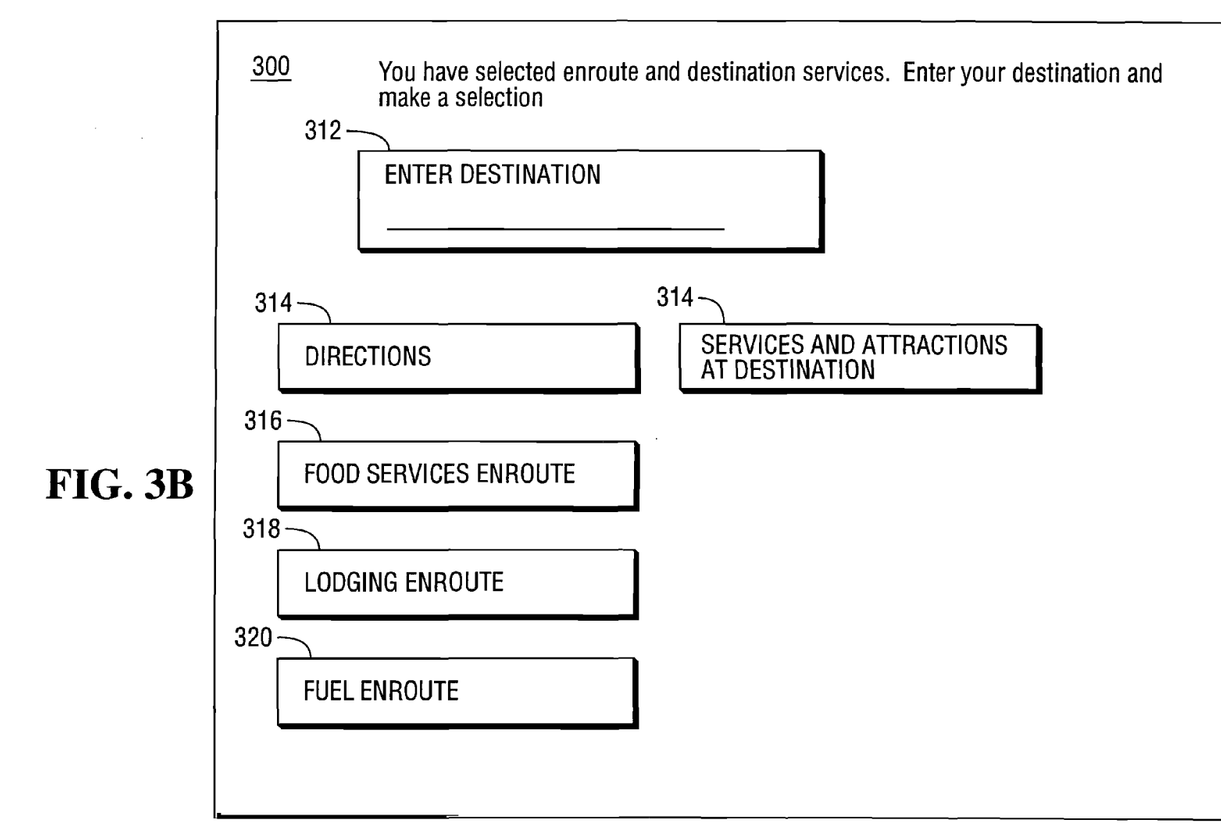

FIG. 3B illustrates a display 310, presented in response to activation of the selector button 304, allowing a user to enter his or her destination using the keyboard 133, and showing a destination entry area 312, allowing the showing the selector buttons 314-320, allowing the user to choose directions, food services along the route, lodging along the route, and fuel stations along the route. The selector button 322 is also displayed, with selection of the button 322 opening a menu of services at the destination. Selection of one of the buttons 314-320 will result in display and printing of a listing of the corresponding services, with the address of and the distance to each of the services in the listing.

Figure 3C:
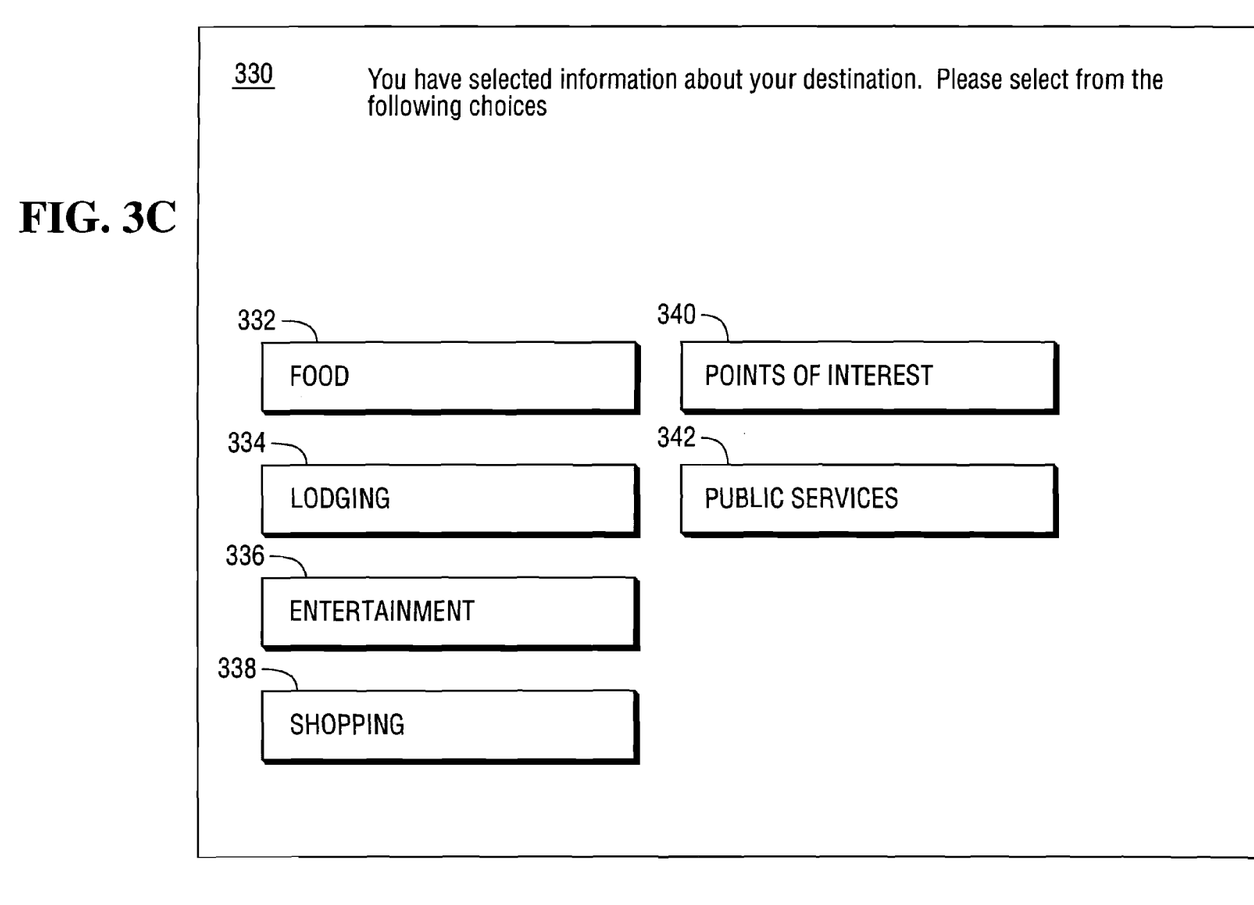
Figure 3D:
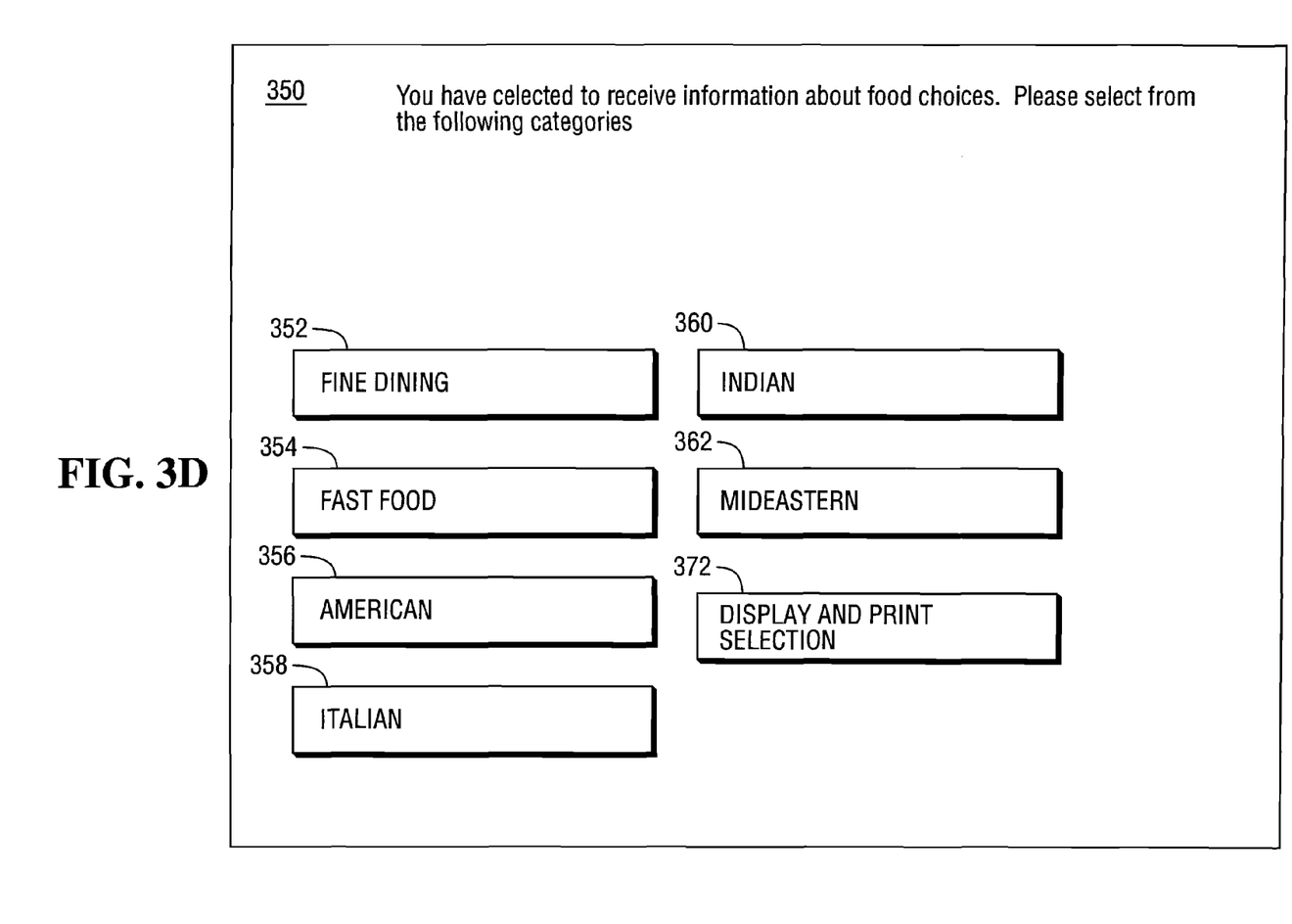

FIG. 3C illustrates a display 330, presenting a menu generated in response to activation of the selector button 322. The display 330 shows selector buttons 332-342, allowing for selection of services in the vicinity of the user's destination, including food services, lodging, entertainment, shopping, points of interest, and public services. FIG. 3D illustrates a display 350, presenting a further menu generated in response to activation of the selector button 332. The menu provides selector buttons 352-362, presenting a variety of food categories. Selection of one of the food categories will in turn present a listing of restaurants in the category, with the user being able to print the listing. The menu further provides a selector button 372, allowing a user to display and print a representative sampling of restaurants. The various menus illustrated here are exemplary, and it will be recognized that the terminal 102B will present numerous menus and sequences of menus in operation, and that numerous combinations of menus may be implemented.

Figure 4:
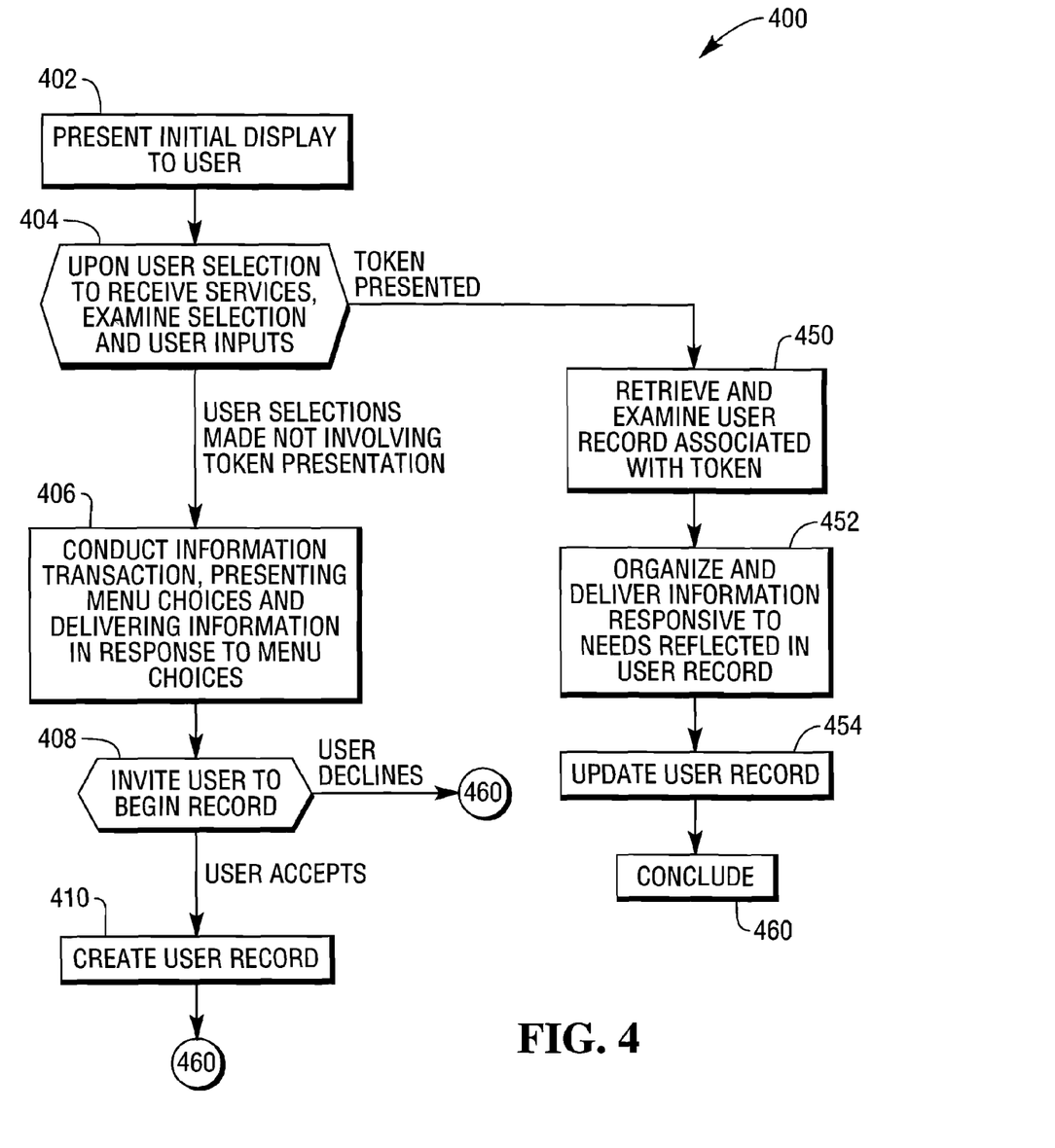
FIG. 4 illustrates a process of providing travel information services according to an aspect of the present invention.

FIG. 4 illustrates the steps of a process 400 of travel information delivery according to an aspect of the present invention. The process 400 may suitably be implemented by a system such as the system 100 of FIG. 1. At step 402, an initial travel information selection display is presented to a user. The display may be presented after, or may be part of, a display assisting in conducting of a transaction, or alternatively may be presented independently of a transaction. The initial travel information selection display may, for example, be automatically presented if user information, such as a user's ZIP code or address information indicates that the user resides out of the geographic area in which the terminal is located.

At step 404, upon an initial user selection to receive information services, the selection and user inputs are examined to determine the nature of information requested and mechanisms used in requesting the information and desired for presenting the information. The selection may take any of a number of forms, such as entry of choices using an interactive display, or presentation or entry of a token. If a token has been entered, the process proceeds to step 450. At step 450, a user record associated with the token is retrieved and examined. At step 452, info nation responsive to needs stated in the user record is organized and presented to the user, for example, as part of a receipt for a point of sale transaction of the user. At step 454, the user record is updated to reflect new information relating to the current transaction. Such information may include the user's location, time of the transaction, and selections made by the user. The process then concludes at step 460.

Returning now to step 404, if the user makes choices from a display or otherwise makes selections that do not involve indication of a user record, the process proceeds to step 406 and an information delivery transaction is conducted, various menus and information items responsive to the user choices are computed, retrieved, and delivered for the user. At step 408, the user is invited to begin a user record. If the user declines, the process concludes at step 460. If the user accepts, the process proceeds to step 410 and a user record reflecting the current transaction is created, storing information such as the location of the transaction, information entered by the user during the transaction, time of transaction, and similar information, and a token associated with the user record is delivered to the user. The process then concludes at step 460.

While the present invention is disclosed in the context of a presently preferred embodiment, it will be recognized that a wide variety of implementations may be employed by persons of ordinary skill in the art consistent with the above discussion and the claims which follow below.

I claim:

1. A travel information delivery terminal comprising:
   a user interface for receiving user inputs and providing user information to carry out a point of sale purchase transaction;
   a receipt printer to print a receipt for the point of sale purchase transaction;
   a memory for storing the user information;
   a communication interface for communicating between the terminal and a remote server;
   a processor for examining the user inputs and determining based on the user inputs if the user requires travel information, the processor being operative upon determining that the user requires travel information to transmit information to the remote server indicating a geographic location of the terminal and user destination information relating to the user, the processor being operative to receive from the server travel directions between the terminal location and the user destination and to format the travel directions for delivery to the user.

2. The terminal of claim 1, wherein the terminal is further operative to receive a user identifier associated with a user record stored in memory of the server, the user record including user destination information, and wherein the terminal is operative to receive directions from the terminal location to the user destination computed based on the user destination information included in the user record.

3. The terminal of claim 2, wherein the terminal further comprises a card reader for reading a user identifier associated with the stored user record.

4. The terminal of claim 3, wherein the processor is operative to retrieve local area information relating to the geographic location of the terminal and deliver the local area information to the user in response to user inputs.

5. The terminal of claim 4, wherein the user inputs comprise submission of a user identifier and the processor is further operative to receive the user record from the server and deliver local area information based on user preferences stated in the user record.

6. The terminal of claim 5, wherein the processor is operative to update the user record with information relating to the user's current transaction and communicate the updated user record to the server.

7. The terminal of claim 1, wherein the processor is operative to direct printing of travel directions for the user on the receipt for the point of sale purchase transaction.

8. The terminal of claim 1, wherein examining the user inputs includes examining identifying information relating to the user to determine if the user is a traveler whose primary residence is at a location away from the geographic vicinity of the terminal, upon determination that the user's primary residence is at a location away from the geographic vicinity of the terminal, to direct presentation of a message inquiring if the user requires travel information.

9. The terminal of claim 1 further comprising:
a payment device comprising a payment card reader for making payment for the point of sale purchase transaction.

10. A data processing server for delivery of travel information to a user, comprising:
a communication interface for communicating with a plurality of user terminals distributed at different geographic locations, said plurality of user terminals including point of sale purchase transaction terminals and freestanding kiosks not serving as purchase transaction terminals;
memory storing terminal information relating to each of the user terminals, including geographic location information for each of the terminals; and
a processor for processing information received from one or more of the terminals to compute and identify travel information responsive to information needs of users conducting transactions at the one or more terminals, the information including travel directions from each terminal at which travel directions are being requested to a destination of a user making the request.

11. The server of claim 10, including one or more stored user records, each user record being associated with a user identifier and including information relating to user information needs.

12. The server of claim 11, wherein one or more of the user records includes user destination information and wherein the processor computes user travel directions for a user based on the user destination information associated with the user.

13. The server of claim 11, wherein one or more of the user records includes stored information including information relating to user travel progress and activities.

14. The server of claim 12, wherein one or more of the user records includes time and location information for information delivery transactions conducted at different user terminals.

15. The server of claim 11, wherein the processor is operative to identify points of interest along a route to a user's destination and deliver information identifying those points of interest to a terminal.

16. A method of travel information delivery, comprising the steps of:
receiving inputs from a user at a point of sale transaction terminal, the inputs relating to a user purchase transaction and identifying travel information needs of the user and including a destination of the user;
communicating information to a remote server based on the user inputs;
communicating to the remote server information identifying a location of the terminal;
receiving information from the remote server, the information including directions from the location of the terminal to the destination of the user; and
controlling a processor of the terminal to complete the user purchase transaction and deliver the information to the user.

17. The method of claim 16, wherein the inputs received from the user include an identifier read from an identification token, wherein the communication of information to the remote server based on the user inputs includes the identifier, and wherein the information received from the remote server includes information responsive to user preferences stored in a user record associated with the user identifier.

18. The method of claim 17, wherein the user record includes the user's destination.

19. The method of claim 17, wherein the user record indicates times and locations of prior user transactions and the travel information received from the server is based in part on conditions indicated by the prior user transactions.

20. The method of claim 17, wherein the conditions indicated by the prior user transactions include travel time, time between stops, and average travel speed.

* * * * *